United States Patent
Bourgeois

Patent Number: 5,729,240
Date of Patent: Mar. 17, 1998

[54] METHOD OF CONTROLLING A NON-GEOSTATIONARY SATELLITE ANTENNA POSITIONER

[75] Inventor: Alain Bourgeois, Eaubonne, France

[73] Assignee: Alcatel Telspace, Nanterre Cedex, France

[21] Appl. No.: 681,506

[22] Filed: Jul. 23, 1996

[30] Foreign Application Priority Data

Jul. 24, 1995 [FR] France .................. 95 08950

[51] Int. Cl.$^6$ .................. H01Q 3/00
[52] U.S. Cl. .................. 343/763; 343/757; 343/765; 342/359
[58] Field of Search .................. 343/757, 763, 343/765, 878, 882; 342/355, 356, 357, 358, 359

[56] References Cited

U.S. PATENT DOCUMENTS

| | | | |
|---|---|---|---|
| 4,994,815 | 2/1991 | Nakayama | 343/765 |
| 5,194,874 | 3/1993 | Perrotta | 343/757 |
| 5,223,845 | 6/1993 | Eguchi | 342/359 |
| 5,227,806 | 7/1993 | Eguchi | 343/763 |
| 5,359,337 | 10/1994 | Eguchi | 343/765 |
| 5,594,460 | 1/1997 | Eguchi | 343/765 |

FOREIGN PATENT DOCUMENTS

0246635A3  11/1987  European Pat. Off. .

*Primary Examiner*—Donald T. Hajec
*Assistant Examiner*—Tan Ho
*Attorney, Agent, or Firm*—Sughrue, Mion, Zinn, Macpeak & Seas, PLLC

[57] ABSTRACT

A tracking antenna for non-geostationary satellites is mounted on a three-axis positioner comprising an azimuth axis, an elevation axis mounted perpendicularly on the azimuth axis and a pseudo-azimuth axis mounted perpendicularly on the elevation axis and supporting the antenna. The positions of the axes are controlled by a pointing unit. The method of pointing the antenna carries out the following steps simultaneously when the position of the satellite is such that the elevation axis exceeds a predetermined elevation value: modifying the position of the azimuth axis at constant speed and modifying the position of the elevation axis and the pseudo-azimuth axis to track the satellite. The second of these steps uses the following equations:

$$X' = -\text{Arctan} \frac{\tan[El(t)]}{\cos[Az(t) - Az^*(t)]}$$

$$Y' = -\text{Arcsin}[\cos El(t) \cdot \sin(Az(t) - Az^*(t))]$$

in which X' and Y' are respectively the positions of the elevation axis and of the pseudo-azimuth axis, Az(t) and El(t) are respectively the azimuth and elevation coordinates of the satellite relative to the antenna, the coordinates Az(t) and El(t) are obtained from ephemeris tables, Az$^*$(t) is equal to Az(ti)+V$_{Az}$.(t-ti), V$_{Az}$ is the rotation speed of the azimuth axis and ti is the time at which the initial position of the satellite is such that the elevation axis exceeds a predetermined elevation angle.

4 Claims, 3 Drawing Sheets

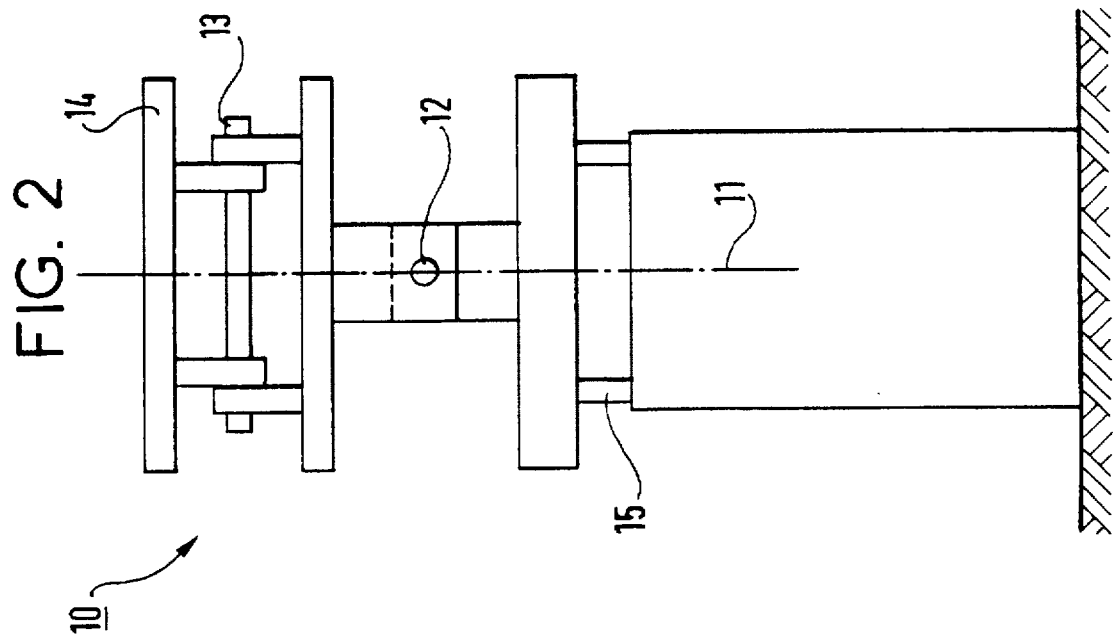
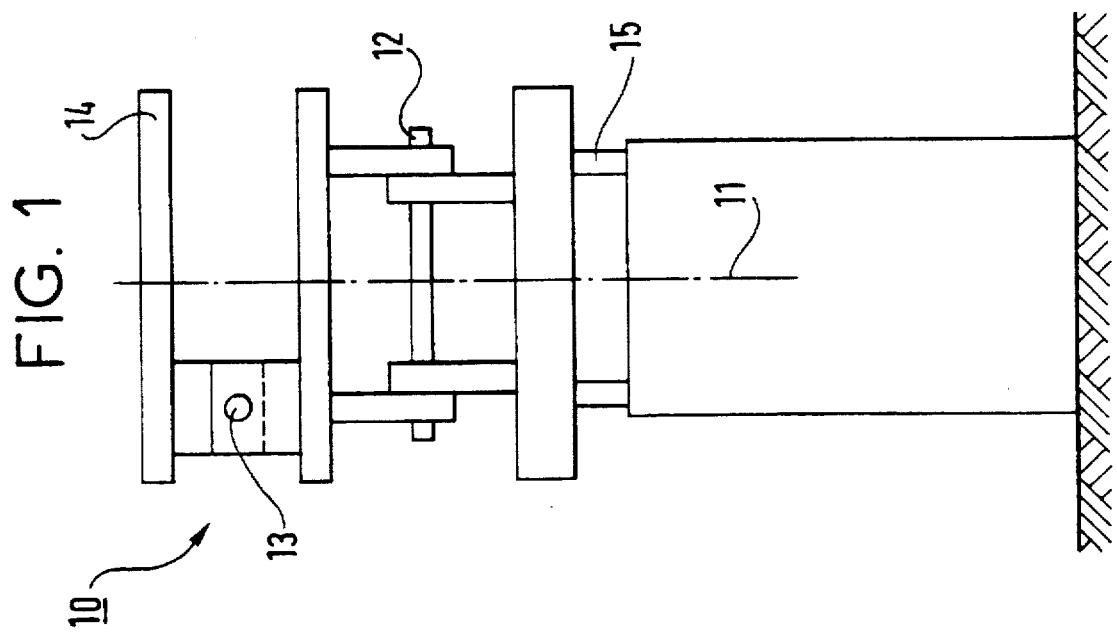

FIG. 5

| DATE | SATELITTE | | | STATION | | | |
|---|---|---|---|---|---|---|---|
| H:mn:s | Long | Lat | Dist | Az | El | X' | Y' |
| 4:08:21 | 349.289 | 44.999 | 1417.23 | 240.646 | 80.115 | 80.115 | 0.000 |
| 4:08:24 | 349.471 | 45.077 | 1414.48 | 240.663 | 80.932 | 81.008 | -1.176 |
| 4:08:27 | 349.653 | 45.154 | 1411.97 | 240.682 | 81.752 | 82.028 | -2.124 |
| 4:08:30 | 349.836 | 45.230 | 1409.69 | 240.702 | 82.574 | 83.131 | -2.829 |
| 4:08:33 | 350.020 | 45.307 | 1407.65 | 240.725 | 83.398 | 84.272 | -3.289 |
| 4:08:36 | 350.204 | 45.383 | 1405.85 | 240.753 | 84.224 | 85.406 | -3.505 |
| 4:08:39 | 350.389 | 45.459 | 1404.29 | 240.787 | 85.053 | 86.490 | -3.488 |
| 4:08:42 | 350.574 | 45.534 | 1402.97 | 240.830 | 85.882 | 87.481 | -3.258 |
| 4:08:45 | 350.760 | 45.609 | 1401.89 | 240.891 | 86.713 | 88.344 | -2.839 |
| 4:08:48 | 350.946 | 45.684 | 1401.05 | 240.987 | 87.545 | 89.047 | -2.262 |
| 4:08:51 | 351.133 | 45.759 | 1400.46 | 241.173 | 88.378 | 89.566 | -1.563 |
| 4:08:54 | 351.320 | 45.833 | 1400.11 | 241.732 | 89.211 | 89.883 | -0.780 |
| 4:08:57 | 351.508 | 45.906 | 1400.00 | 42.590 | 89.953 | 89.985 | 0.045 |
| 4:09:00 | 351.697 | 45.980 | 1400.13 | 59.721 | 89.121 | 89.871 | 0.869 |
| 4:09:03 | 351.886 | 46.053 | 1400.51 | 60.197 | 88.288 | 89.543 | 1.650 |
| 4:09:06 | 352.075 | 46.125 | 1401.13 | 60.368 | 87.455 | 89.013 | 2.346 |
| 4:09:09 | 352.265 | 46.198 | 1401.99 | 60.459 | 86.623 | 88.299 | 2.917 |
| 4:09:12 | 352.456 | 46.270 | 1403.10 | 60.517 | 85.793 | 87.426 | 3.329 |
| 4:09:15 | 352.647 | 46.341 | 1404.44 | 60.560 | 84.963 | 86.426 | 3.552 |
| 4:09:18 | 352.838 | 46.412 | 1406.03 | 60.593 | 84.135 | 85.335 | 3.559 |
| 4:09:21 | 353.031 | 46.483 | 1407.86 | 60.620 | 83.309 | 84.195 | 3.333 |
| 4:09:24 | 353.223 | 46.554 | 1409.92 | 60.643 | 82.485 | 83.049 | 2.863 |
| 4:09:27 | 353.416 | 46.624 | 1412.23 | 60.663 | 81.663 | 81.942 | 2.146 |
| 4:09:30 | 353.610 | 46.694 | 1414.76 | 60.682 | 80.844 | 80.921 | 1.188 |
| 4:09:33 | 353.804 | 46.763 | 1417.54 | 60.699 | 80.028 | 80.028 | 0.000 |

METHOD OF CONTROLLING A NON-GEOSTATIONARY SATELLITE ANTENNA POSITIONER

BACKGROUND OF THE INVENTION

1. Field of the Invention

The field of the invention is that of an antenna used in transmission by non-geostationary satellite and concerns in particular a method of controlling a positioner of an antenna of this kind.

2. Description of the Prior Art

Non-geostationary satellites, for example the satellites of the Globalstar (protected name) project, follow various orbits in space to provide complete coverage of the Earth (eight orbits in the case of Globalstar). The receiving antennas on the ground must be able to track these various motions and in particular the passage of a satellite through the zenith of an antenna. In this case to ensure the continuity of the link the antenna, which is usually a parabolic antenna, must be directed along a vertical line through the location.

Antennas mounted on two-axis positioners, having an azimuth axis and an elevation axis (Az-El mount) cannot provide a continuous link if the satellite passes through the zenith since in this case the azimuth axis must rotate 180° in theoretically zero time when the satellite passes through the zenith of the antenna. Three-axis positioners have been developed to solve this problem of passage through the zenith. Reference may be had to European patent N° 0 246 635 in the name of NEC Corporation, for example. This patent describes a tracking antenna for non-geostationary satellites mounted on a three-axis positioner comprising:

an azimuth axis;

an elevation axis mounted perpendicularly on the azimuth axis;

a pseudo-azimuth axis mounted perpendicularly on the elevation axis and supporting the antenna.

The positions of the three axes are controlled by a pointing unit and the tracking method employed consists in carrying out the following steps simultaneously when the position of the satellite is such that the elevation axis exceeds a predetermined elevation value:

-a- modifying the position of the azimuth axis at constant speed;

-b- modifying the position of the elevation axis and the pseudo-azimuth axis to track the satellite.

Steps -a- and -b- are such that the satellite is tracked continuously for as long as it remains within a cone centered on the zenith, i.e. as long as the elevation is greater than a given value.

The drawback of this tracking method is that the tracking means measure the level of the signal transmitted by the satellite. Error signals are produced for the purpose of fine tracking and it follows that the tracking means are complex and costly. Moreover, the accuracy of tracking depends on the reliability of the error signals.

What is more, the satellite being tracked is not necessarily transmitting at the time when the antenna is to be pointed, and in particular on passing through the zenith, or at least entering the cone. In this case tracking is not possible.

One object of the present invention is to alleviate these drawbacks.

To be more precise, one object of the invention is to provide a method of pointing a tracking antenna for non-geostationary satellites mounted on a three-axis positioner that is controlled when the satellite is within a cone centered on the zenith without using error signals.

SUMMARY OF THE INVENTION

The above object, and others that emerge hereinafter, are achieved by a method of pointing a tracking antenna for non-geostationary satellites, said antenna being mounted on a three-axis positioner comprising:

an azimuth axis;

an elevation axis mounted perpendicularly on said azimuth axis;

a pseudo-azimuth axis mounted perpendicularly on said elevation axis and supporting said antenna, the positions of said axes being controlled by a pointing unit, said method consisting in carrying out the following steps simultaneously when the position of said satellite is such that the elevation axis exceeds a predetermined elevation value:

-a- modifying the position of said azimuth axis at constant speed;

-b- modifying the position of said elevation axis and said pseudo-azimuth axis to track said satellite, wherein said step -b- consists in utilizing the following equations:

$$X' = -\text{Arctan} \frac{\tan[El(t)]}{\cos[Az(t) - Az^*(t)]}$$

$$Y' = -\text{Arcsin}[\cos El(t) \cdot \sin(Az(t) - Az^*(t))]$$

in which X' and Y' are respectively the positions of said elevation axis and of said pseudo-azimuth axis, Az(t) and El(t) are respectively the azimuth and elevation coordinates of said satellite relative to said antenna, the coordinates Az(t) and El(t) are obtained from ephemeris tables, $Az^*(t)$ is equal to $Az(ti)+V_{Az}.(t-ti)$, $V_{Az}$ is the rotation speed of said azimuth axis and ti is the time at which the initial position of said satellite is such that said elevation axis exceeds a predetermined elevation angle.

The use of ephemeris tables for pointing the antenna on a non-geostationary satellite achieves accurate pointing, even if transmission is not continuous.

In one embodiment, $Az^*(t)$ is the real position of the azimuth axis, as given by an azimuth encoder for example. This makes it possible to allow for acceleration and deceleration of the azimuth axis.

Other features and advantages of the invention will emerge from a reading of the following description of a preferred embodiment given by way of non-limiting illustrative example and from the appended drawings.

BRIEF DESCRIPTION OF THE DRAWINGS

FIGS. 1 and 2 are respectively and side views of a prior art three-axis positioner.

FIG. 5 is a table showing the positions of the elevation and pseudo-azimuth axes as a function of the coordinates of a satellite passing through the zenith of an antenna the positioner of which is controlled by the method of the invention.

DETAILED DESCRIPTION OF THE PREFERRED EMBODIMENT

Figure 3:
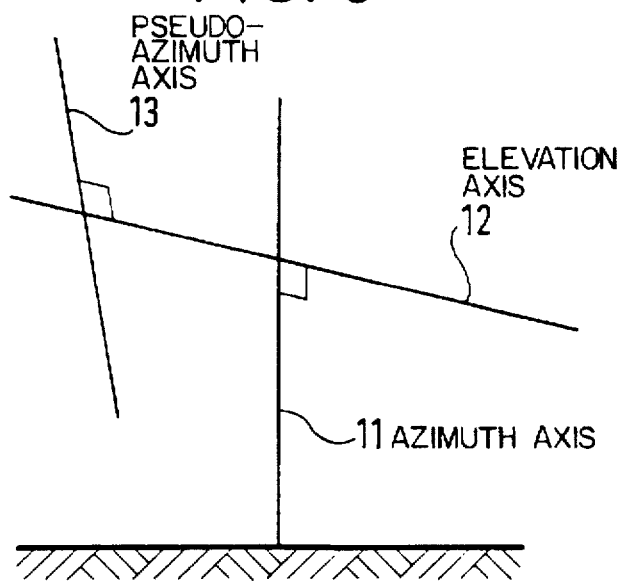
FIG. 3 is a diagram showing the articulations of a three-axis positioner of this kind.

FIGS. 1 and 2 are respectively front and side views of a prior art three-axis positioner. Components that are the same in both figures carry the same reference number.

An antenna positioner 10 has three axes: an azimuth axis 11, an elevation axis 12 and a pseudo-azimuth axis 13. The antenna, not shown, is designed to be mounted on an antenna support 14 mounted on the pseudo-azimuth axis 13.

The elevation axis 12 is perpendicular to the azimuth axis 11 and the pseudo-azimuth axis 13 is perpendicular to the elevation axis 12. Movement about these three axes is controlled (by a pointing unit that is not shown) by a bearing 15 in the form of a toothed ring driven by a pinion in the case of the azimuth axis 11 and by racks or rams, as described in the aforementioned patent, in the case of the elevation axis 12 and the pseudo-azimuth axis 13.

FIG. 3 is a diagram showing the articulations of a three-axis positioner of this kind. The three axes are the azimuth axis 11, elevation axis 12 and pseudo-azimuth axis 13. The azimuth axis is the local vertical and the elevation axis is the local horizontal.

Figure 4:
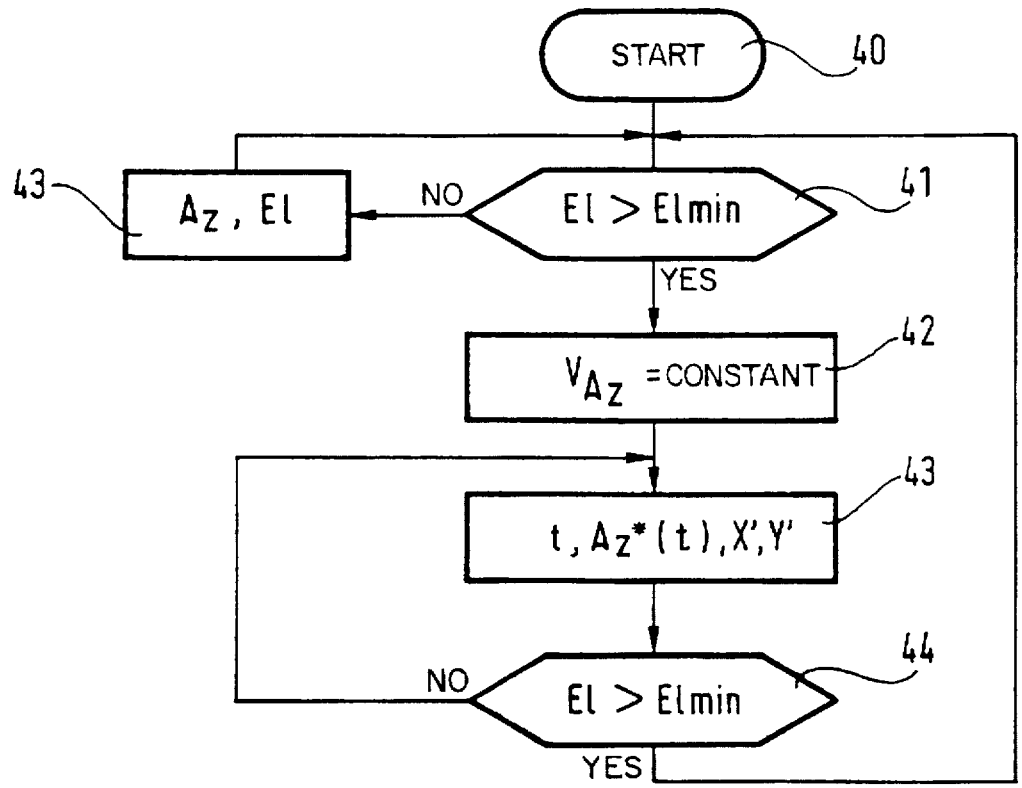
FIG. 4 is a flowchart showing the method of the invention.

FIG. 4 is a flowchart showing the method of the invention.

The first step in this flowchart is the Start step 40. Step 41 determines if the elevation angle is greater than a given value. This value is equal to 80° to the horizontal at the geographical location at which the antenna is installed, for example. If the result is positive, this means that the satellite will enter a cone centered on the zenith with a cone angle of 20° (2×(90−80)). The next step is step 42 in this case. If the result is negative, step 43 commands the position of the antenna in the same way as for a conventional Az-El mount, i.e. with no movement about the pseudo-azimuth axis. The antenna is controlled in accordance with ephemeris tables, as explained below.

FIG. 5 is a table showing the position of the elevation and pseudo-azimuth axes as a function of the coordinates of a satellite passing through the zenith of an antenna the positioner of which is controlled by the method of the invention. It shows the dates at which a non-geostationary satellite will enter the cone referred to. The following data is considered here: the antenna is at a longitude (Long) of 351.5° and a latitude (Lat) of 45.9°; the altitude of the satellite is 1 400 km and the inclination of its orbit is 52° to the equator. The time increment is 3 seconds. The ephemeris tables indicate that on the day in question, at 4 hours 8 minutes 21 seconds, the satellite will be at a longitude of 349.289°, a latitude of 44.999° and an altitude of 1 417.23 km.

The Az and El columns correspond to the coordinates of the satellite as seen from the ground station and therefore from a conventional Az-El type positioner structure, i.e. one with no pseudo-azimuth axis. Between 4 hours 8 minutes 54 seconds and 4 hours 8 minutes 57 seconds the azimuth axis must rotate approximately 180°, i.e. at a rate of 60° per second (the elevation axis El is virtually at 90°). This is impossible given the mass of antenna and the positioner, as already mentioned in the description of the prior art.

For this reason the azimuth axis is rotated at constant speed between the times at which the satellite enters and leaves the cone previously mentioned. The rotation speed of the azimuth axis is calculated in step 42 from the equation:

$$V_{Az} = \frac{Az_f - Az_i}{t_f - t_i}$$

in which $Az_f$ is the final azimuth at which the satellite leaves the cone, $Az_i$ is the initial azimuth at which the satellite enters the cone, $t_f$ is the final azimuth time and $t_i$ is the initial azimuth time. Consulting the FIG. 5 table gives, for example:

$$V_{Az} = \frac{(360) + 60.699 - 240.646}{4:09:33 - 4:08:21} = \frac{180.053°}{72 \text{ s}} = 2.50073°/s$$

Accordingly, between times $t_i$ and $t_f$, the azimuth axis is rotated at a constant speed of 2.50073°/s.

In step 43 the positions of the elevation and pseudo-azimuth axes are modified to track the satellite in accordance with the following equations:

$$X' = -\text{Arctan} \frac{\tan[El(t)]}{\cos[Az(t) - Az^*(t)]}$$

$$Y' = -\text{Arcsin}[\cos El(t) \cdot \sin(Az(t) - Az^*(t))]$$

where X' and Y' are respectively the positions of the elevation and pseudo-azimuth axes and Az(t) and El(t) are respectively the azimuth and elevation coordinates of the satellite relative to the antenna as a function of time (columns Az and El), the coordinates Az(t) and El(t) also being obtained from ephemeris tables. $Az^*(t)$ is equal to Az $(ti)+V_{Az}\cdot(t-ti)$.

These equations enable accurate tracking of the movement of the satellite entering the cone. When the satellite leaves the cone, the position of the azimuth axis is that for which tracking in conventional Az-El mode is possible.

Columns X' and Y' of the FIG. 5 table give the positions in degrees of the elevation and pseudo-azimuth axes. Note that there is no longer any sudden discontinuity of pointing.

Step 44 tests if the satellite has left the cone. This test may compare the current time with the predicted time for the satellite to leave the 20° cone, for example. If the result is negative, three-axis rotation control continues. If the result is positive the method resumes at step 41.

The predetermined elevation value from which the three axes are set in motion is preferably 80°, which corresponds to a 20° cone. This value is compatible with the tracking antennas usually employed for image transmission by military satellites. The cone angle depends on the maximal rotation speed of the azimuth axis and can vary according to the altitude of the satellite.

One advantage of the invention is that the range of movement of the elevation axis is only 90° and thus it is not necessary to use elevation control racks enabling 180° rotation. This simplifies the structure of the positioner.

In a different embodiment the value of $Az^*(t)$ is not that defined previously but that read off from the azimuth encoder at time t. The azimuth encoder is a position sensor, for example, and supplies the real azimuth value at the time t in question. It is thus possible to allow for acceleration and deceleration of the azimuth axis drive means (for example a motor) and to increase the accuracy of satellite tracking.

There is claimed:

1. Method of pointing a tracking antenna for non-geostationary satellites, said antenna being mounted on a three-axis positioner comprising:

an azimuth axis;

an elevation axis mounted perpendicularly on said azimuth axis;

a pseudo-azimuth axis mounted perpendicularly on said elevation axis and supporting said antenna, the positions of said axes being controlled by a pointing unit, said method consisting in carrying out the following steps simultaneously when the position of said satellite is such that the elevation axis exceeds a predetermined elevation value:

-a- modifying the position of said azimuth axis at constant speed;

-b- modifying the position of said elevation axis and said pseudo-azimuth axis to track said satellite, wherein said step -b- consists in utilizing the following equations:

$$X' = -\text{Arctan} \frac{\tan[El(t)]}{\cos[Az(t) - Az^*(t)]}$$

$$Y' = -\text{Arcsin}[\cos El(t) \cdot \sin(Az(t) - Az^*(t))]$$

in which X' and Y' are respectively the positions of said elevation axis and of said pseudo-azimuth axis, Az(t) and El(t) are respectively the azimuth and elevation coordinates of said satellite relative to said antenna, the coordinates Az(t) and El(t) are obtained from ephemeris tables, $Az^*(t)$ is equal to $Az(ti)+V_{Az} \cdot (t-ti)$, $V_{Az}$ is the rotation speed of said azimuth axis and ti is the time at which the initial position of said satellite is such that said elevation axis exceeds a predetermined elevation angle.

2. Method according to claim 1 wherein said predetermined elevation value is 80°.

3. Method of pointing a tracking antenna for non-geostationary satellites, said antenna being mounted on a three-axis positioner comprising:

an azimuth axis;

an elevation axis mounted perpendicularly on said azimuth axis;

a pseudo-azimuth axis mounted perpendicularly on said elevation axis and supporting said antenna, the positions of said axes being controlled by a pointing unit, said method consisting in carrying out the following steps simultaneously when the position of said satellite is such that the elevation axis exceeds a predetermined elevation value:

-a- modifying the position of said azimuth axis at constant speed;

-b- modifying the position of said elevation axis and said pseudo-azimuth axis to track said satellite, wherein said step -b- consists in utilizing the following equations:

$$X' = -\text{Arctan} \frac{\tan[El(t)]}{\cos[Az(t) - Az^*(t)]}$$

$$Y' = -\text{Arcsin}[\cos El(t) \cdot \sin(Az(t) - Az^*(t))]$$

in which X' and Y' are respectively the positions of said elevation axis and of said pseudo-azimuth axis, Az(t) and El(t) are respectively the azimuth and elevation coordinates of said satellite relative to said antenna, the coordinates Az(t) and El(t) are obtained from ephemeris tables, $Az^*(t)$ is the real position as a function of time of said azimuth axis and ti is the time at which the initial position of said satellite is such that said elevation axis exceeds a predetermined elevation angle.

4. Method according to claim 3 wherein said predetermined elevation value is 80°.

* * * * *